(12) United States Patent
Rastegar et al.

(10) Patent No.: US 7,425,918 B2
(45) Date of Patent: Sep. 16, 2008

(54) SYSTEM AND METHOD FOR THE MEASUREMENT OF FULL RELATIVE POSITION AND ORIENTATION OF OBJECTS

(75) Inventors: Jahangir S. Rastegar, Stony Brook, NY (US); Carlos M. Pereira, Tannersville, PA (US)

(73) Assignee: Omnitek Partners, LLC, Bayshore, NY (US)

( * ) Notice: Subject to any disclaimer, the term of this patent is extended or adjusted under 35 U.S.C. 154(b) by 253 days.

(21) Appl. No.: 11/196,695

(22) Filed: Aug. 3, 2005

(65) Prior Publication Data

US 2007/0001051 A1    Jan. 4, 2007

Related U.S. Application Data

(60) Provisional application No. 60/598,529, filed on Aug. 3, 2004.

(51) Int. Cl.
*G01S 7/40* (2006.01)
*F41G 7/00* (2006.01)

(52) U.S. Cl. .......................... 342/173; 342/61; 342/62; 342/165; 342/175; 244/3.1

(58) Field of Classification Search ........... 244/3.1–3.3; 342/62, 351–355, 359–367, 5–12, 61, 165–174; 89/1.11; 343/700 R, 705, 767–771
See application file for complete search history.

(56) References Cited

U.S. PATENT DOCUMENTS

| | | | | |
|---|---|---|---|---|
| 3,137,853 A | * | 6/1964 | Cutler | 342/355 |
| 3,564,257 A | * | 2/1971 | Bery et al. | 244/3.16 |
| 3,897,918 A | * | 8/1975 | Gulick et al. | 244/3.19 |
| 3,984,068 A | * | 10/1976 | McPhee | 244/3.19 |
| 4,540,139 A | * | 9/1985 | Levy et al. | 244/3.19 |
| 4,750,689 A | * | 6/1988 | Yf | 244/3.14 |
| 4,971,266 A | * | 11/1990 | Mehltretter et al. | 244/3.19 |
| 5,099,246 A | * | 3/1992 | Skagerlund | 342/361 |
| 5,258,764 A | * | 11/1993 | Malinowski | 342/359 |
| 5,613,650 A | * | 3/1997 | Kaifu et al. | 244/3.16 |
| 6,724,341 B1 | * | 4/2004 | Pereira et al. | 342/62 |
| 7,023,380 B2 | * | 4/2006 | Schneider | 342/361 |
| 7,193,556 B1 | * | 3/2007 | Pereira et al. | 342/62 |

FOREIGN PATENT DOCUMENTS

EP    0239156 A1 *  9/1987

* cited by examiner

*Primary Examiner*—Bernarr E Gregory (57) ABSTRACT

Methods are provided where: a signal is transmitted from an illuminating source and received cavity waveguides disposed on an object; a position and/or orientation of the object is determined based on the signal received in the waveguides; and data representing the determined position and/or orientation is transmitted to a remote location or generated for use in the object. The illuminating source can also be moved to indicate a change in a predetermined trajectory or target position where a new position and/or orientation of the object is determined based on the signal received in the waveguides and the object is controlled to change the predetermined trajectory or target position to the indicated new predetermined trajectory or new target position. A change can also be detected in the predetermined trajectory or target position and the object controlled to correct the change.

2 Claims, 11 Drawing Sheets

Figure 11

SYSTEM AND METHOD FOR THE MEASUREMENT OF FULL RELATIVE POSITION AND ORIENTATION OF OBJECTS

CROSS-REFERENCE TO RELATED APPLICATIONS

The present application claims priority to U.S. provisional patent application, titled "Waveguide Sensors" Ser. No. 60/598,529, filed on Aug. 3, 2004, which is incorporated herein by reference. The present application is related to U.S. Pat. No. 6,724,341, which is incorporated herein by reference.

FIELD OF THE INVENTION

The present invention relates to systems (sensors) designed to measure full angular orientation and position of an object relative to another object, systems for the validation of the performance of onboard position and orientation sensors and systems for remote guidance of a moving object.

BACKGROUND OF THE INVENTION

For a moving object such as a smart munition to be guided or its motion altered or controlled, the control system that provided guidance and control action must have real-time information about the position and orientation of the object. In general and depending on each specific application, the position and orientation may be those of the moving object relative to a ground station, or relative to another moving platform.

To meet the requirements of the U.S. Army's future needs in the areas of precision-guided direct- and indirect-fire munitions, it is important that the position and orientation sensors be capable of being integrated reliably and economically into small- and medium-caliber munitions as well as long-range munitions. In particular, it is desirable to embed such sensors in the munitions, and that the sensors be autonomous and provide onboard position and orientation information relative to a ground station or other moving platforms.

Currently, radar-based guidance, often augmented by Global Positioning System (GPS) data, is used to determine information related to the position of munitions. Radar-based guidance of munitions is based upon the use of radio frequency (RF) antennas printed or placed on the surface of munitions to reflect RF energy emanating from a ground-based radar system. The reflected energy is then used to track the munition or the stream of bullets on the way to the target. The surface printed or placed antennas are, however, not suitable for munitions applications since they cannot survive the firing environment and readily loose their accuracy. Such surface printed or placed antenna based sensors also require large amount of power for their operation, and are very sensitive to geometrical variations and tolerances.

Corrections to a munition's flight path are currently possible but only if the munitions are equipped with an additional suite of internal sensors such as Inertia Measurement Unit (IMU's), accelerometers, and gyroscopes. Global Positioning Signals (GPS) are also used alone or in combination with other sensors such as accelerometers and gyroscopes. However, such inertia-based sensors are relatively complex and inaccurate, occupy a considerable amount of volume, consume a large amount of power, are prone to drift and settling problems, and are relatively costly. The GPS sensors cannot provide orientation information and are prone to the loss of signal along the path of travel.

Furthermore, the current IMU technology cannot be implemented for munitions that are subjected to extremely high acceleration rates during firing, such as medium and small caliber munitions. High performance munitions may be subjected to accelerations in excess of 100,000 Gs. In general, inertia based sensors have not been successfully developed to survive firing accelerations of 30,000 Gs and over and also be capable to have measurement sensitivity to measure low acceleration levels required for guidance and control purposes.

It is readily appreciated by those skilled in the art that the issues and concerns described above for munitions are generally true for all mobile platforms.

A need therefore exists for position and orientation measurement systems (sensors) in general, and for those that could be mounted or embedded into various moving platforms for their guidance and control. In munitions applications in particular, the full position and orientation (pitch, yaw and roll) information defines the motion of munitions in-flight and allows it to be guided towards its target.

Furthermore, to guide a moving object along a desired trajectory, the object must be equipped with internal sensors to provide its position and/or orientation to the control system to generate an appropriate control signal, preferably as feedback in a closed-loop control, to keep or guide the object towards the desired trajectory within a certain margin of error. The most common position and/or orientation measurement sensors include various accelerometers and gyroscopes. Magnetometers have been used mostly to determine orientation of the object relative to the ground (usually called roll). Alternatively, the position and/or orientation sensory information may be provided by an external means such as a GPS system. Global Positioning Signals (GPS) are used particularly to obtain position information. Alternatively, the methods and systems disclosed in U.S. Pat. No. 6,724,341 and discussed briefly below could be used.

Hereinafter, path and position are intended to indicate orientation as well, noting that a rigid object requires three independent position information and three independent orientation information to uniquely specify its position and orientation in an appropriate reference system.

In a similar manner, guidance and control of munitions in flight is possible only if the munitions are equipped with a suite of internal sensors such as Inertia Measurement Unit (IMU's), accelerometers, gyroscopes, magnetometers and/or Global Positioning Signals (GPS). In general, more than one of the above sensors are required to obtain full position and orientation information onboard an object, including munitions. Alternatively, the methods and systems disclosed in U.S. Pat. No. 6,724,341 could be used.

The shortcoming of the inertia based sensors, including drift and noise, are described in U.S. Pat. No. 6,724,341. The magnetometers are generally not very sensitive for accurate roll measurement and respond to large nearby masses. The GPS sensors cannot provide accurate orientation information and are prone to the loss of signal along the path of travel. These shortcomings are important to all moving objects, but are particular important to guided munitions, including gun-fired projectile, mortars, sub-munitions, rockets and bombs. In addition, inertia based sensors occupy a considerable amount of volume, consume a large amount of power, are prone to drift and settling problems and are relatively costly. The methods and systems disclosed in U.S. Pat. No. 6,724,341 are shown to overcome the aforementioned shortcomings of the currently available sensors for use onboard moving objects in general and onboard munitions in particular.

During engineering development and testing of remotely controlled, autonomous, guided robotic mobile platforms, gun-fired guided munitions, rockets, unmanned aerial vehicles (UAV), unmanned guided floating and submerged platforms, and other similar moving objects and/or platforms, the development, testing and performance evaluation personnel and teams need to have the means to determine and validate the performance of the overall system and its various components as well as the of their guidance and control algorithms and software. Such guidance and control system and component hardware and software testing capability is essential for the design and development engineers to validate and/or modify their computer models and other formulations and calculations, to evaluate and test various components under operating conditions, and to evaluate and modify and/or debug their control algorithms and software, etc. This capability is also essential for testing and validating the performance of the final product.

Another objective of the present invention is to provide a method and means of determining and/or validating the performance of the guidance and control system of a guided object and its various hardware and software components.

SUMMARY OF THE INVENTION

Accordingly, a method for transmitting data from a moving object to a remote location is provided. The method comprising: transmitting a signal from an illuminating source; receiving the signal at three or more cavity waveguides disposed on the object; determining a position and/or orientation of the object relative to the illuminating source based on a strength of the signal received in the three or more cavity waveguides; and transmitting data representing the determined position and/or orientation to the remote location.

The method can further comprise processing the transmitted data at the object. The method can further comprise digitizing the data prior to transmission.

The method can further comprise processing the transmitted data at the remote location.

The remote location can be a location from which the signal is transmitted.

Also provided is a method for generating data representing a determined position and/or orientation of a moving object. The method comprising: transmitting a signal from an illuminating source; receiving the signal at three or more cavity waveguides disposed on the object; determining a position and/or orientation of the object relative to the illuminating source based on a strength of the signal received in the three or more cavity waveguides; and generating data representing the determined position and/or orientation for use in the object.

The method can further comprise utilizing the data for guidance and control of the object.

The method can further comprise utilizing the data for validating position and/or orientation data from another system.

The method can further comprise utilizing the data for setting and/or resetting inertia based sensors in the object.

The method can further comprise utilizing the data for carrying out a command associated with the object.

Still further provided is a method for changing a predetermined trajectory or target position of a moving object. The method comprising: transmitting a signal from an illuminating source; receiving the signal at three or more cavity waveguides disposed on the object; determining a position and/or orientation of the object relative to the illuminating source based on a strength of the signal received in the three or more cavity waveguides; moving the illuminating source to indicate a change in the predetermined trajectory or target position to a new predetermined trajectory or new target position; determining the new position and/or orientation of the object relative to the illuminating source based on a strength of the signal received in the three or more cavity waveguides; and controlling the object to change the predetermined trajectory or target position to the indicated new a predetermined trajectory or new target position.

Still yet further provided is a method for correcting a predetermined trajectory or target position of a moving object. The method comprising: transmitting a signal from an illuminating source; receiving the signal at three or more cavity waveguides disposed on the object; determining a position and/or orientation of the object relative to the illuminating source based on a strength of the signal received in the three or more cavity waveguides; detecting a change in the predetermined trajectory or target position; and controlling the object to correct the change in the predetermined trajectory or target position.

BRIEF DESCRIPTION OF THE DRAWINGS

These and other features, aspects, and advantages of the apparatus and methods of the present invention will become better understood with regard to the following description, appended claims, and accompanying drawings where:

FIG. 8 is an illustration of an autonomous onboard absolute position and orientation measurement system (sensor) of the second embodiment of the present invention, illustrating an implementation that relies on at least one triaxial accelerometer to determine the position of a first object (in this case a munition in flight) by sensing accelerations in X, Y, Z directions of a Cartesian coordinate system fixed to the object relative to the fixed reference Cartesian coordinate system $X_{ref}Y_{ref}Z_{ref}$, wherein the signals from at least one e polarized radio frequency transmitter (illuminator) is received by waveguides embedded in the first object to determine the orientation of the object relative to the reference coordinate system $X_{ref}Y_{ref}Z_{ref}$, so that together, they provide a system (sensor) for the measurement of the position and orientation of the first object relative to the reference coordinate system $X_{ref}Y_{ref}Z_{ref}$.

Similar numerals refer to similar elements in the drawings. It should be understood that the sizes of the different components in the figures are not necessarily in exact proportion or to scale, and are shown for visual clarity and for the purpose of explanation.

DETAILED DESCRIPTION OF PREFERRED EMBODIMENTS

Figure 1:
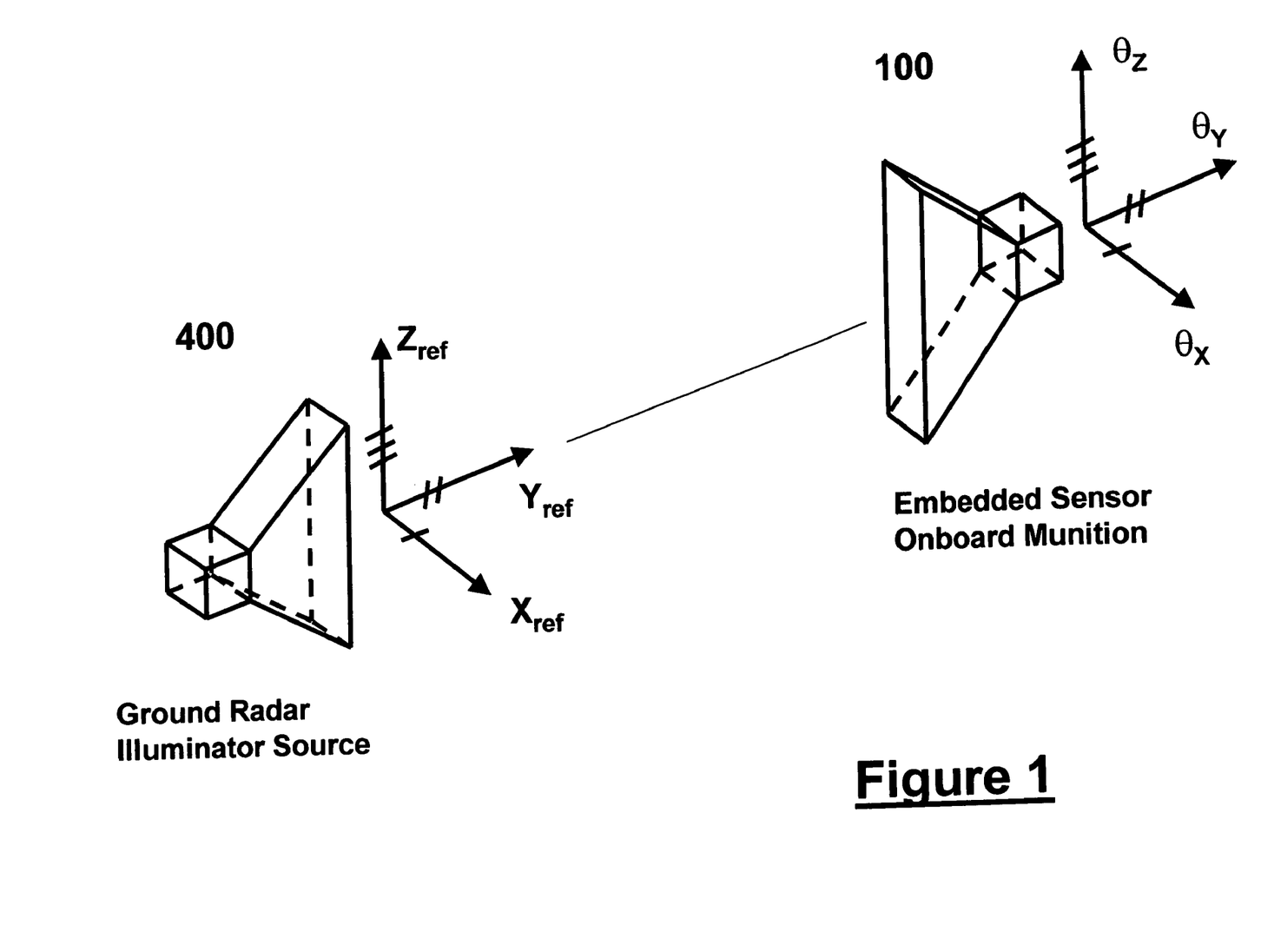
FIGS. 1 and 2 represent views of the embodiment of an autonomous onboard absolute position and orientation measurement system (sensor) for a munition application illustrating a preferred relative distribution of a plurality of embedded waveguide sensors in the fins of a munition for guidance and control.
Figure 2:
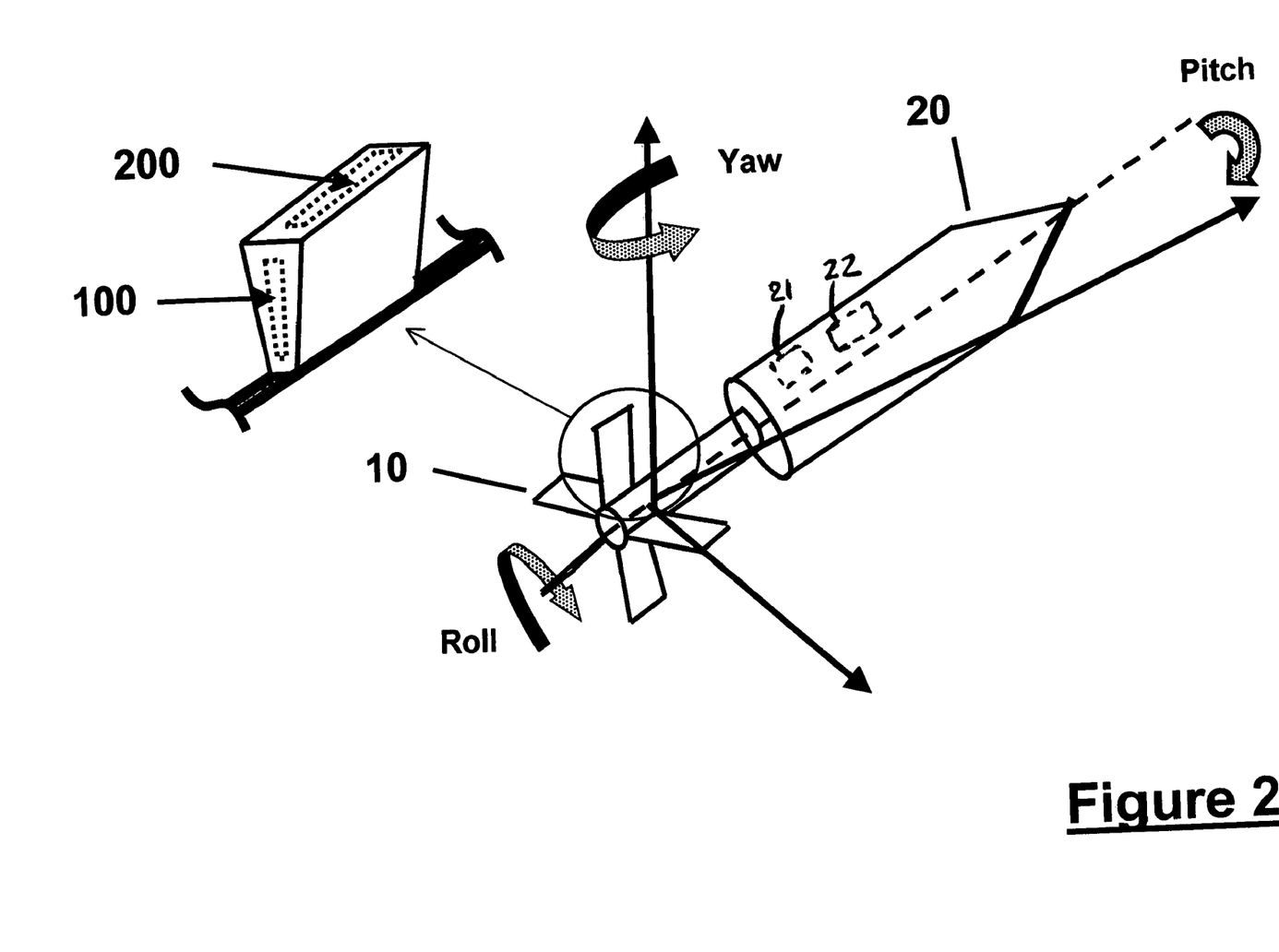

FIGS. 1 and 2 illustrate an autonomous onboard position and orientation measurement system (hereinafter also referred to as "position and orientation sensor") 10 for an object (in this case a munition) 20. The present invention has particular utility where the object is a munition for tracking such munition during flight. However, those skilled in the art will appreciate that the system and methods of the present invention are useful with other types of objects, for example for onboard measurement of the position and orientation of a mobile robotic platform relative to the ground (for a fixed illuminating source) or another mobile robotic platform (on which the illuminating source is affixed) for navigational purposes; for measurement of full position and orientation of a vehicle as being tested for suspension performance, and in general, in any system or device in which the position and orientation of the system or device is to be measured relative to a fixed (ground) or moving platform. In all such applications, the desired position and orientation are measured directly (for example, not by measuring accelerations) and the information is available onboard the system or device itself and can be made available to any other fixed or mobile station, including the ground or mobile station where the illuminating source is located. The position and orientation sensor 10 is comprised of one or more waveguide antennas (hereinafter also referred to as "waveguides") 100 and 200, some of which are shown for illustration purpose.

Figure 3:
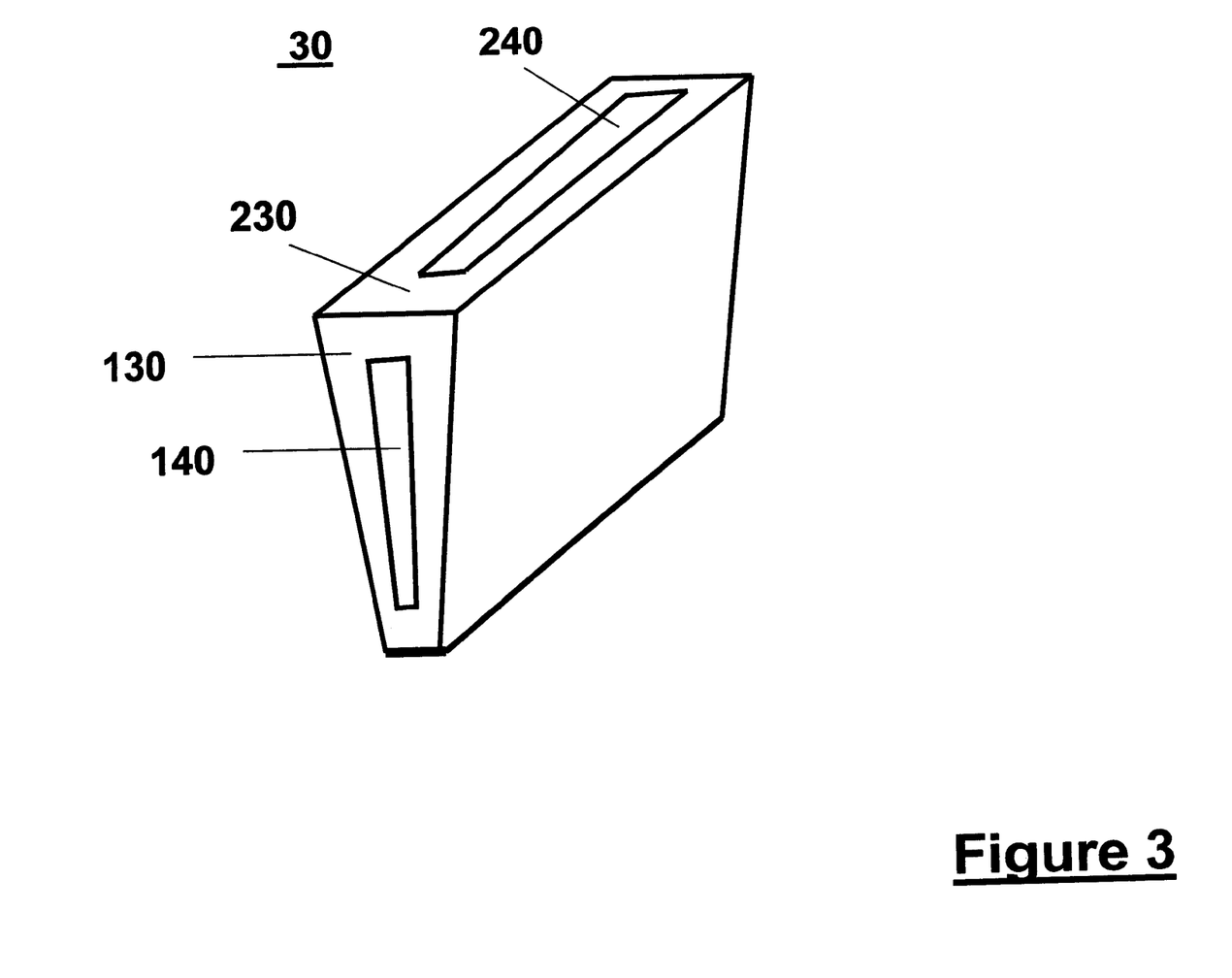
FIG. 3 is an enlarged view of a representative fin with embedded waveguide sensors forming part of the munition of FIGS. 1 and 2.

With further reference to FIG. 3, the waveguides 100 and 200 are embedded along various sides or faces of each or selected fins 30 of the munition 20. In FIG. 3, the waveguides are shown to be embedded in the fins of the munition. It is, however, appreciated by those skilled in the art that the waveguides may be embedded anywhere in an object, as long as it is not covered by materials that block the propagation of the emitted electromagnetic waves into the waveguide cavity. The waveguides may, for example for the case of munitions with fins, be along a radial face 130 of a fin 30 as the waveguide 100 with the correspondingly rectangular shaped frontal openning 140; or as an axial waveguide 200 that extends along a longitudinal face 230 of the fin 30 and is embedded within a correspondingly rectangular shaped frontal opening 240.

The waveguides 100 and 200 are generally similar in design and construction, and therefore only one representative antenna 100 will be described in more detail. The waveguide 100 is comprised of a waveguide cavity 115 and a receiver 111 secured to the base area of the waveguide cavity 115, as shown in FIG. 4.

Depending on the desired application, the waveguide cavity 115 may be filled with air or a solid or liquid dielectric. In addition to the features of the waveguide 100 that have been previously enumerated, the embedded nature of the waveguide cavity 115 enables a strong structure. The relatively simple design of the waveguide 100 also reduces the implementation costs.

Figure 4:
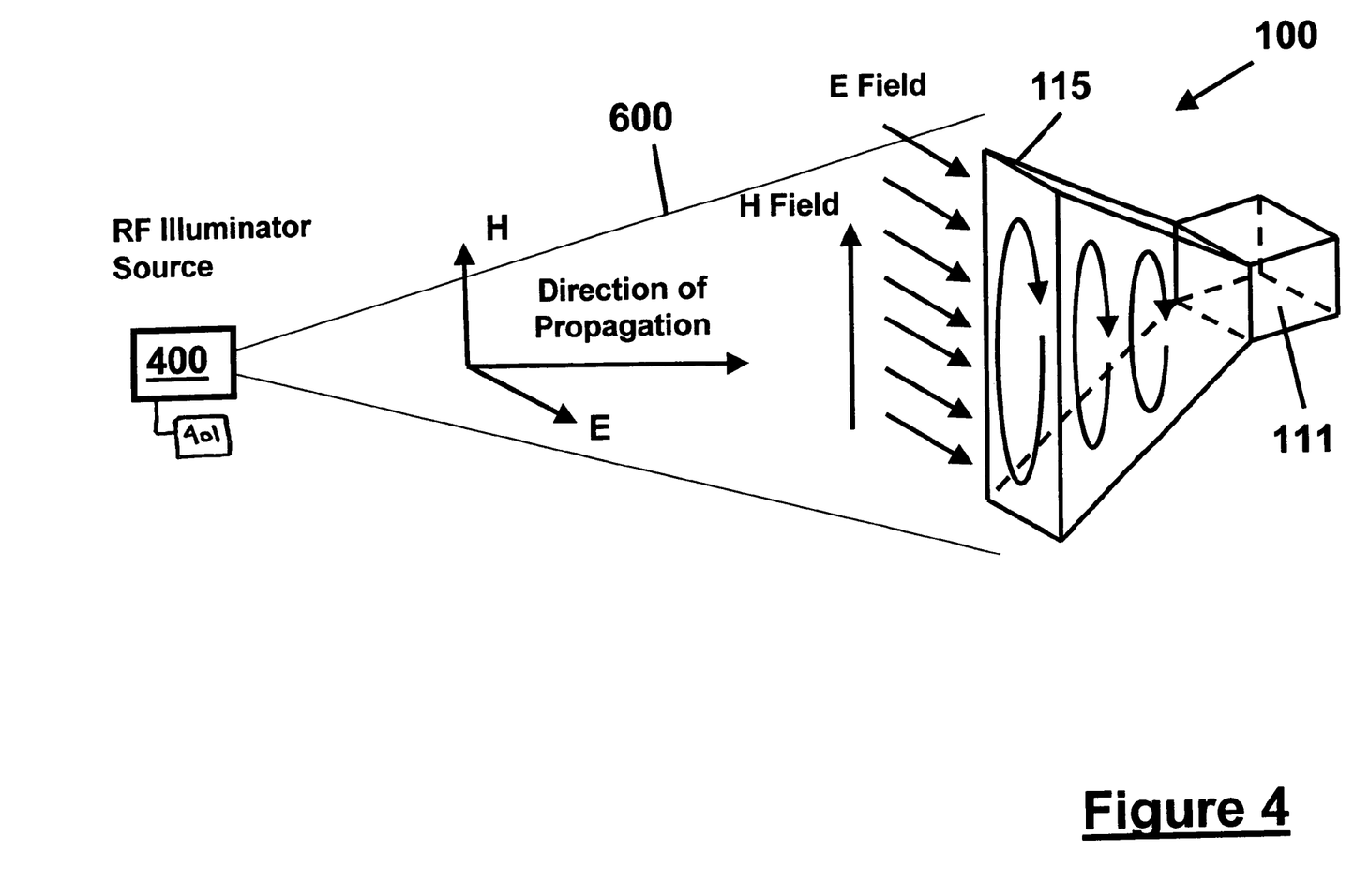
FIG. 4 is an enlarged view of a waveguide antenna of the type employed in the position and orientation measuring system of FIGS. 1 and 2 to be embedded in the fin of FIG. 3.

Referring now to FIGS. 1 and 4 there is shown a representation of the waveguide sensor 100 and its operation with respect to a polarized radio frequency illumination source (or illuminator) 400 affixed to a ground control station. An electromagnetic wave consists of orthogonal electric (E) and magnetic (H) fields which are orthogonal to each other. The electric field E and the magnetic field H of the illumination beam are mutually also orthogonal to each other and to the direction of propagation of the illumination beam. In line-of-site applications polarized microwave energy, the planes of E and H fields are fixed and stay unchanged in the direction of propagation. Thus, the illumination source establishes a coordinate system with known and fixed orientation, and a polarization with a known plane of reference as set by the illuminating source 400 of the ground station. The waveguide 100 reacts in a predictable manner to a polarized illumination beam. When three or more waveguides are distributed over the body of an object, and when the object is positioned at a known distance from the illuminating source, the amplitudes of the signals received by the waveguides can be used to determine the orientation of the object relative to the illuminating source. The requirement for the proper distribution of the waveguides over the body of the projectile is that at least three of the waveguides be neither parallel nor co-planar.

With more specific reference to FIGS. 1 and 4, the polarization mismatch between the illuminating source 400 and the sectoral horn waveguide sensor 100 is caused by a variation in the angle $\theta_y$, FIG. 1. At a given positioning of the waveguide 100 relative to the illuminating source 400, the amplitude of the signal received by the sectoral horn waveguide 100 is also a function of rotations $\theta_X$ and $\theta_Z$. For the waveguide 100 shown in FIGS. 1 and 4, the amplitude of the signal received is most sensitive to rotation $\theta_X$ and least sensitive to rotation $\theta_Z$.

For a given waveguide and illuminating source, the relationships between the signal received at the waveguide as a function of the angles $\theta_X$, $\theta_Y$ and $\theta_Z$ can be described as follows. It is well known that for an arbitrary pair of transmit and receive antennas, such as the illuminating source 400 and the sectoral horn waveguide receiver antenna (sensor) 100, in free-space, the power received at the receiver 111 is given by the so-called Friis transmission equation. For a given position of the waveguide sensor 100 relative to the illuminating source 400, this transmission equation can be written as $$P_r = P_t(\lambda/4\pi R)^2 G_{tot} G_g(\theta_X, \theta_Z) |\rho_t^* \rho_r|^2 \tag{1}$$

where $P_t$ and $P_r$ are the transmitted and received powers, respectively; $\lambda$ is the wavelength and R is the radial distance between the transmitter and receiver; $\rho_t$ and $\rho_r$ are the polarization unit vectors of the transmitter and receiver, respectively; $G_{tot}$ is the total gain corresponding to factors other than spatial orientation of the receiver relative to the illuminating source; and for a given waveguide cavity, $G_g$ is a function of the angular orientation of the waveguide indicated by the angles $\theta_X$ and $\theta_Z$, and is related to the geometrical design of the waveguide cavity. For most practical antennas, the gains $G_{tot}$ and $G_g$ are complicated functions of antenna geometry, size, material properties and polarization. In general, these functions have to be theoretically evaluated or measured in an anechoic chamber. While closed-form analytical expressions for some canonically shaped antennas, for other antenna types one needs to resort to numerical techniques such as Method of Moments (MOM), Finite-Difference Time Domain Method (FDTD), or Finite Element Method (FEM), all of which are well known in the art.

Figure 10:
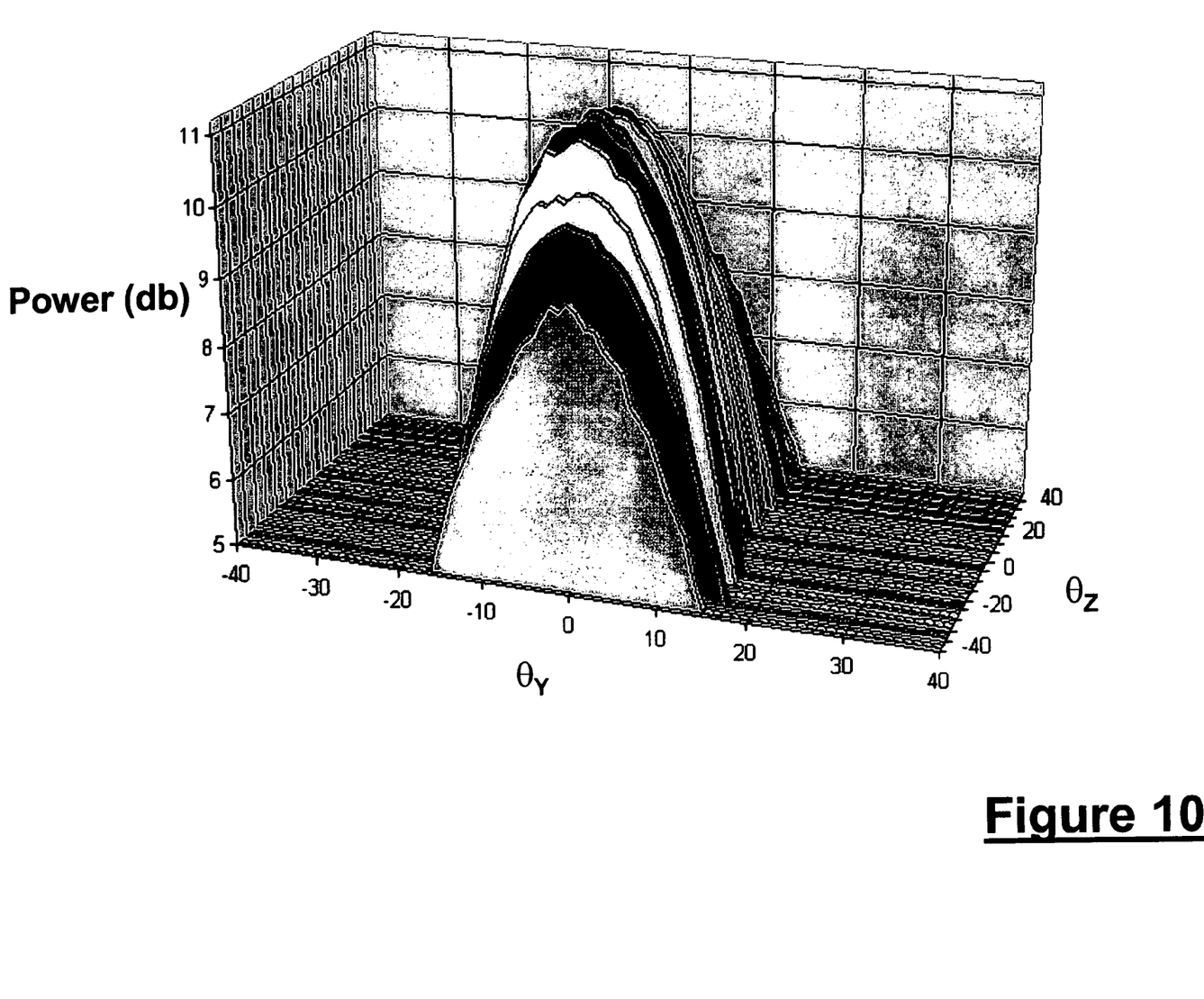
FIG. 10 represents data collected by a sectoral horn waveguide sensor from a polarized source positioned at a fixed distance. Experimental data relating the waveguide output to the angular orientations $\theta_X$, $\theta_Y$ and $\theta_Z$, may be readily measured in an anechoic chamber.

For a given sectoral horn waveguide antenna 100, 200 positioned at a fixed distance from a polarized illuminating source, the waveguide output power as a function of the angular orientations described by angles $\theta_X$, $\theta_Y$ and $\theta_Z$, may readily be measured in an anechoic chamber. For a given position and orientation measurement application, such measurements can be made for the full range of spatial rotation of the waveguide sensors 100, 200 and the information can be stored in tabular or graphical or any other appropriate form. This information serves as calibration data for each waveguide sensor 100, 200. Then when three or more waveguide sensors 100, 200 are embedded in an object 20, for a given position of the object 20 relative to the illuminating source 400, the power output of the waveguides 100, 200 can be matched with the calibration data to determine the spatial orientation of the object 20 relative to the illuminating source 400 which may be stationary or moving relative to the object 20. For a typical sectoral horn waveguide, the plot of the power output as a function of the angular rotations $\theta_Y$ and $\theta_Z$, as measured in an anechoic chamber is shown in FIG. 10.

Figure 5:
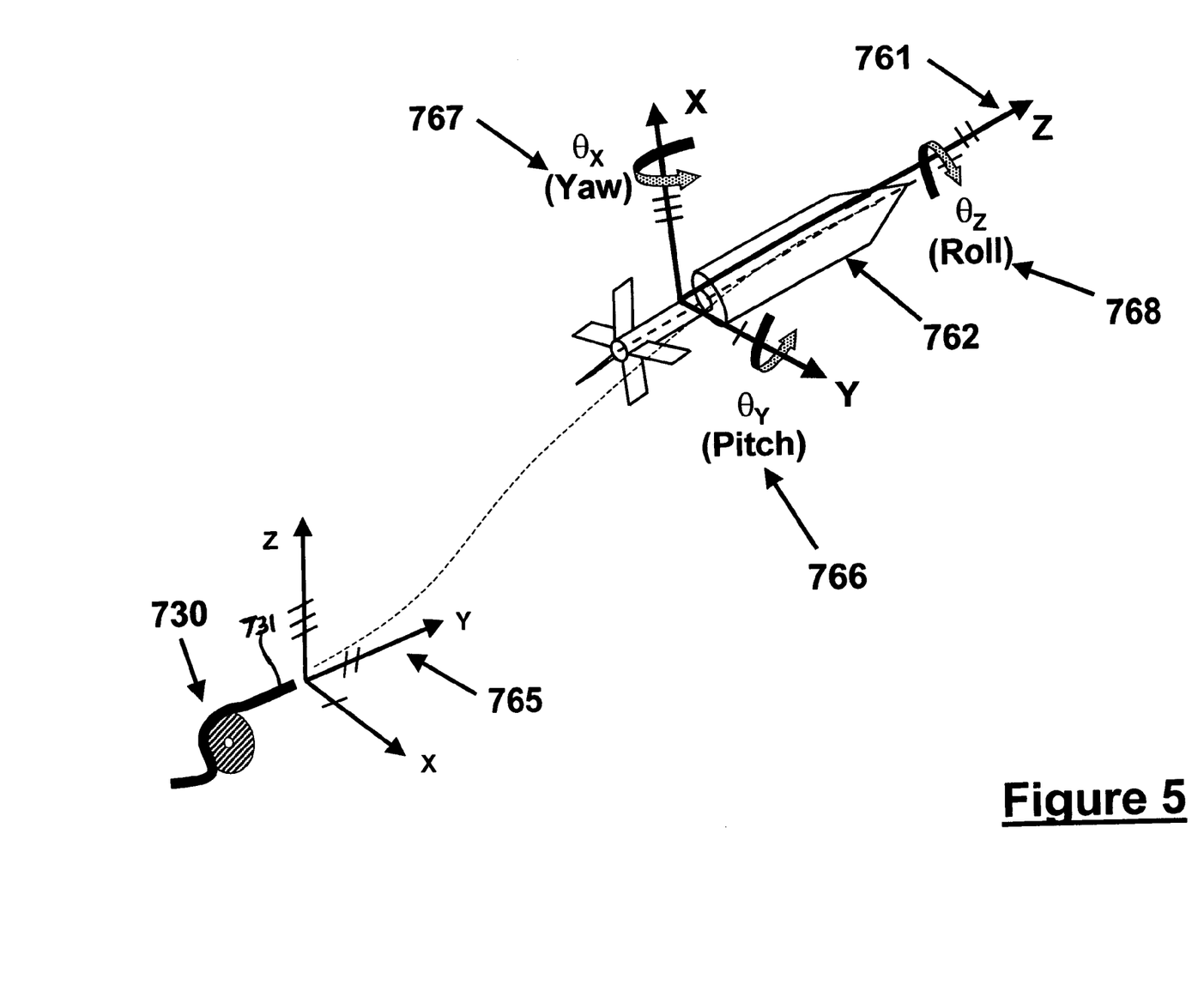
FIG. 5 is an illustration of the preferred coordinate systems that can be used to indicate the orientation of an object in flight (in this case a munition) relative to a fixed object (in this case a gun). In this illustration, the orientation is described by the pitch, yaw and roll, customarily used for munitions in flight.

FIG. 5 is an illustration of a coordinate system 761 fixed to the object in flight 762 (in this case a munition) for indicating its orientation relative to a fixed object (in this case the coordinate system 765 is fixed to the gun 730). In the coordinate system 761, the orientation of the object in flight (762) relative to the fixed coordinates 765 is described by the pitch (766), yaw (767) and roll (768), customarily used for objects, such as munitions, in flight.

Figure 6:
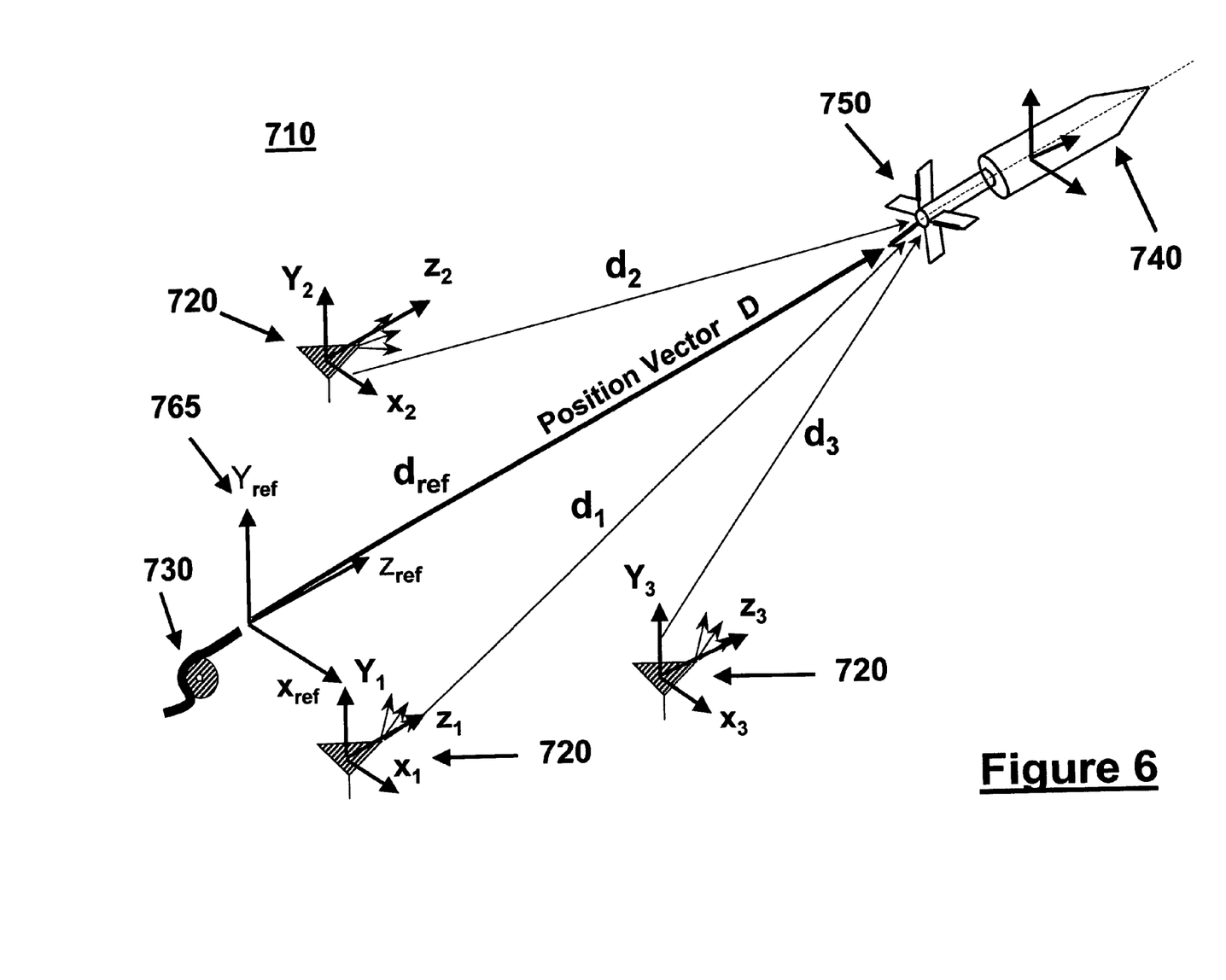
FIG. 6 is an illustration of an autonomous onboard absolute position and orientation measurement system of a first embodiment of the present invention, illustrating a plurality of polarized radio frequency sources, called illuminators, shown surrounding a first object (in this case the fixed gun emplacement), to provide temporally synchronized, pulsed or continuous polarized RF signals that illuminate a second object (in this case a munition in flight), for providing onboard information about the position and orientation of the second object (munition in flight) relative to the first object (the fixed gun).

FIG. 6 illustrates yet another embodiment 710 of the present invention, which relies on three or more of, preferably pulsed, radio frequency sources (illuminators) 720, providing temporally synchronized, excitations that illuminate a projectile such as a munition 740 (or any other object). A minimum of three illuminators 720 is required though a greater number increases the accuracy of the onboard position calculations. The positions of the illuminators 720 relative to the gun do not need to be known, as long the position of the projectile 740 is desired to be determined relative to the illuminators 720. If the position of the projectile 740 relative to the gun 730 is desired to be determined, then the position of the illuminators 720 relative to the gun 730 needs to be known.

Figure 7:
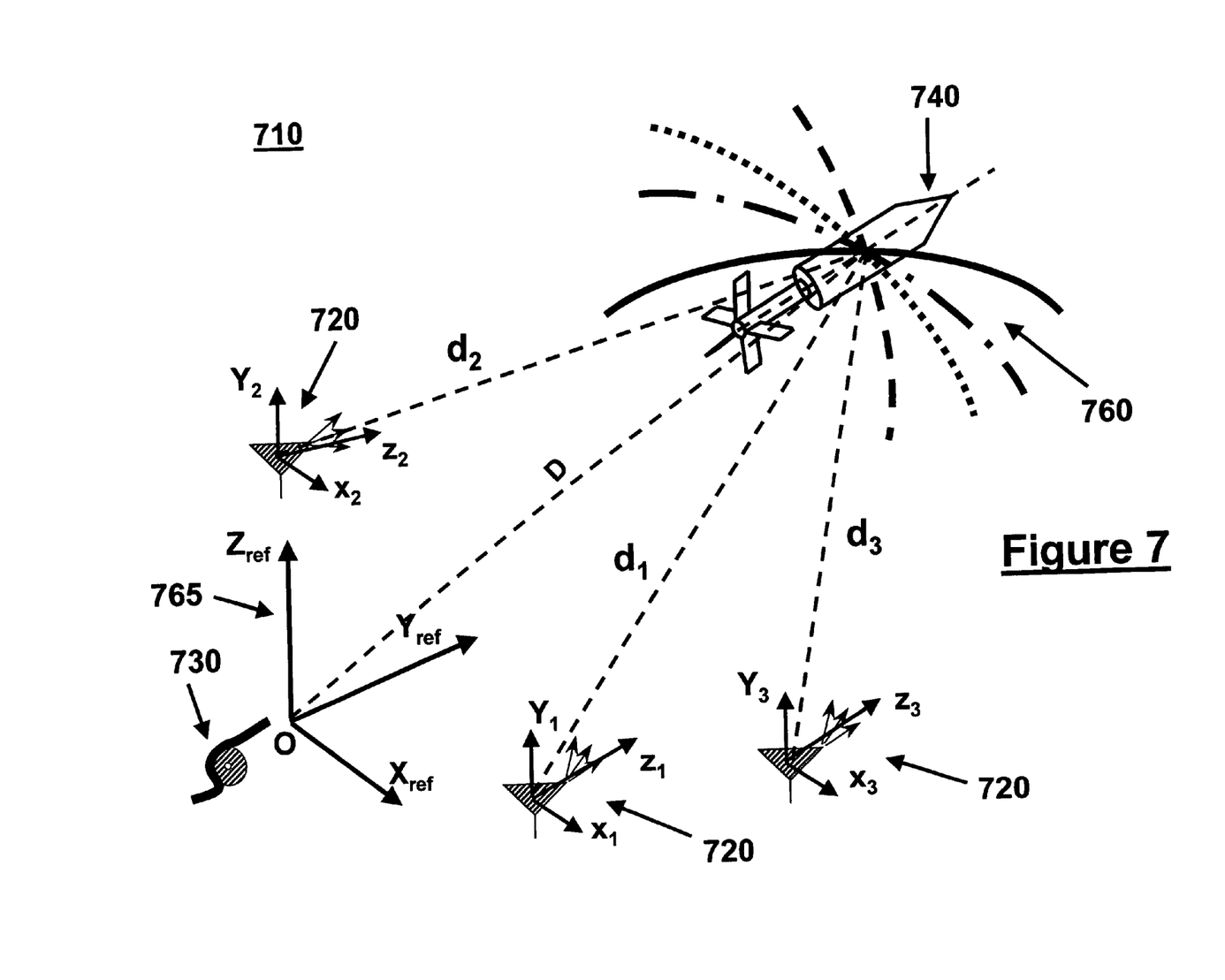
FIG. 7 is an illustration of the geometry and parameters of interest in the determination of the position of the second object (in this case a munition in flight) relative to a first object (in this case the fixed gun emplacement 730) in the embodiment of FIG. 6.

With reference to FIG. 7, the radio frequency pulses emanating from the illuminators 720 propagate to the projectile 740 in flight. The time taken for the signals to reach the projectile 740 from each illuminator 720 is then measured and used to calculate the distance between each of the illuminators 720 and the projectile 740, knowing the speed of propagation of electromagnetic signal to be equal to the speed of light.

Still with reference to FIG. 7, it can be understood that the distances $d_1$, $d_2$ and $d_3$, as measured from each of the illuminators 720 to the projectile 740 can be used to calculate the position of the projectile 740 relative to the illuminators 720 and to the gun 730. It is obvious to those skilled in the art that the position of an object in space relative to another object requires three independent distance measurement such as those of $d_1$, $d_2$ and $d_3$, or alternatively coordinates X, Y and Z in the Cartesian coordinate system $X_{ref}Y_{ref}Z_{ref}$, in which the position of the illuminators 720 and the gun 730 are known, or simply by a position vector D, which is a vector drawn from the origin O of a coordinate system of interest such as the $X_{ref}Y_{ref}Z_{ref}$ coordinate system to the position of the object of interest, in this case the projectile 740.

Succinctly, the algorithm for calculating the distance and the position vector is as follows: The distances, $d_1$, $d_2$ and $d_3$, as measured from each of the illuminators 720 to the projectile 740 defines the radii of spheres 760, with each sphere centered at the position of the respective illuminator 720. These spheres 760 intersect at a minimum of two points.

However, only one intersection location is a possible solution to describe the projectile position in the coordinate system, i.e., the position vector D. An onboard processor in the projectile 740 is capable of determining the distances $d_1$, $d_2$ and $d_3$ from the elapsed times, the points of intersection between the three spheres 760, determine which one of the two points of intersection indicates the position of the projectile 740 by comparing the two points with the previous position of the projectile 740 and considering that the motion of the projectile 740 has to be continuous, and, finally, the position vector D.

Figure 8:
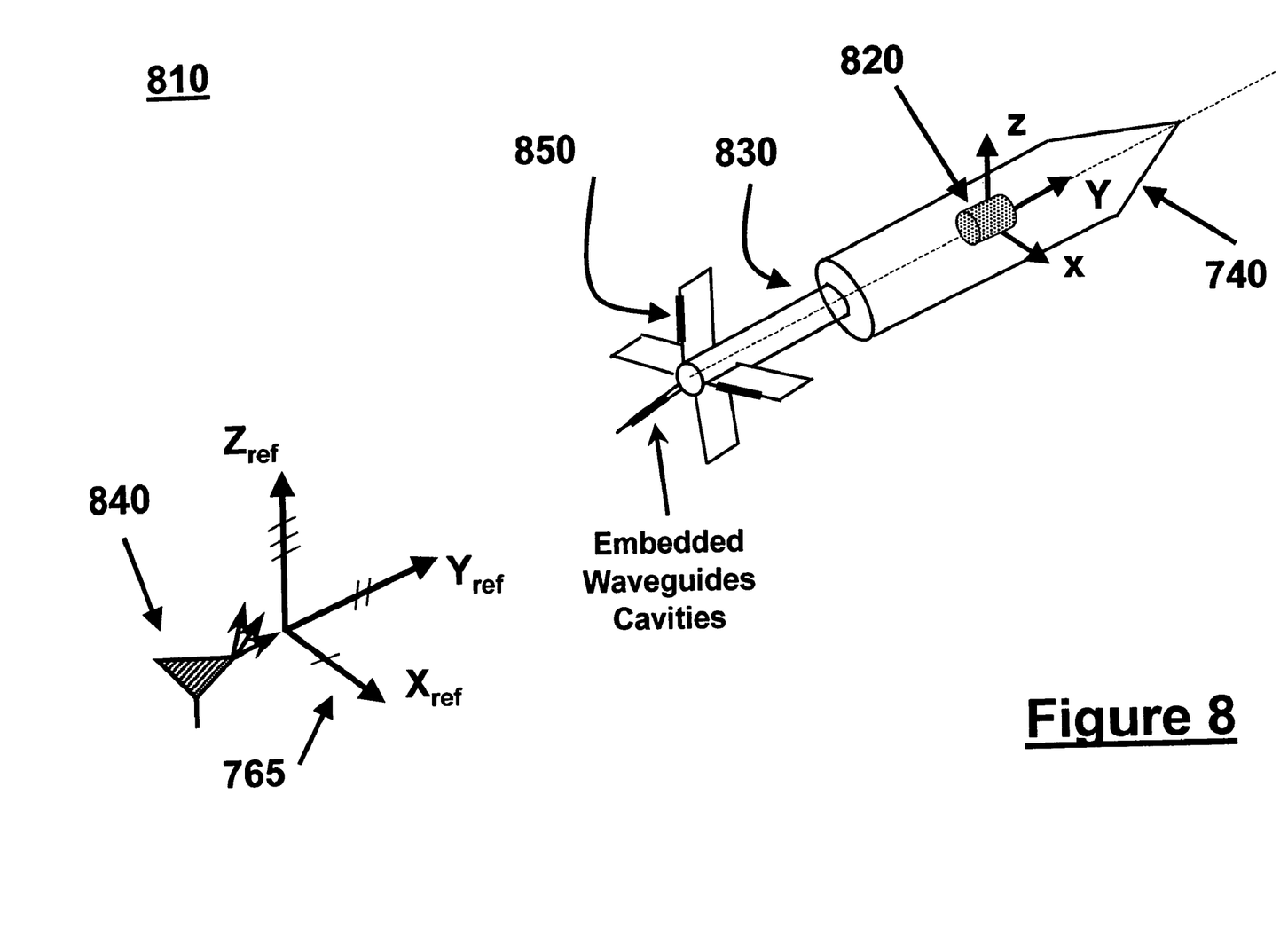

FIG. 8 is an illustration of an autonomous onboard absolute position and orientation referencing system of another embodiment. Illustrated is an implementation 810 that relies on at least three linear accelerometers measuring accelerations in three independent directions such as a tri-axial accelerometer unit 820, measuring acceleration in the indicated X, Y, and Z directions. Tri-axial linear accelerometers are well known in the art, for example, their piezo or MEMS based versions are widely available commercially and may be used for the present application. The accelerations measured by the three accelerometers of the tri-axial accelerometer 820 are then used to determine the position of the projectile 740 relative to the reference Cartesian coordinate system $X_{ref}Y_{ref}Z_{ref}$ (765). The position information may then be augmented by the projectile orientation relative to the coordinate system $X_{ref}Y_{ref}Z_{ref}$ (765) using signals provided by a polarized radio frequency transmitter 840 and received by integral waveguides 850 in the projectile 740.

Using this novel approach it is possible to overcome the inherent difficulties and inaccuracies associated with inertial components for measuring the orientation of an object relative to another object.

In another embodiment of the present invention, the position of the projectile 740 is measured using GPS and the orientation of the projectile 740 relative to a fixed or mobile object indicated by the Cartesian coordinate system $X_{ref}Y_{ref}Z_{ref}$ by the waveguides illuminated by the illuminator 840, FIG. 8. It should be apparent that other modifications might be made to the present referencing systems 10, 710 and 810 without departing from the spirit and scope of the invention. As an example, though the present invention has been described in relation to a projectile, it should be clear to one of ordinary skill in the art that the present invention may also be used to measure the position of an object relative to another fixed or mobile object; the orientation of an object relative to another fixed or mobile object; or the position and orientation of an object relative to another object. The measurements may be planar or spatial.

Figure 9:
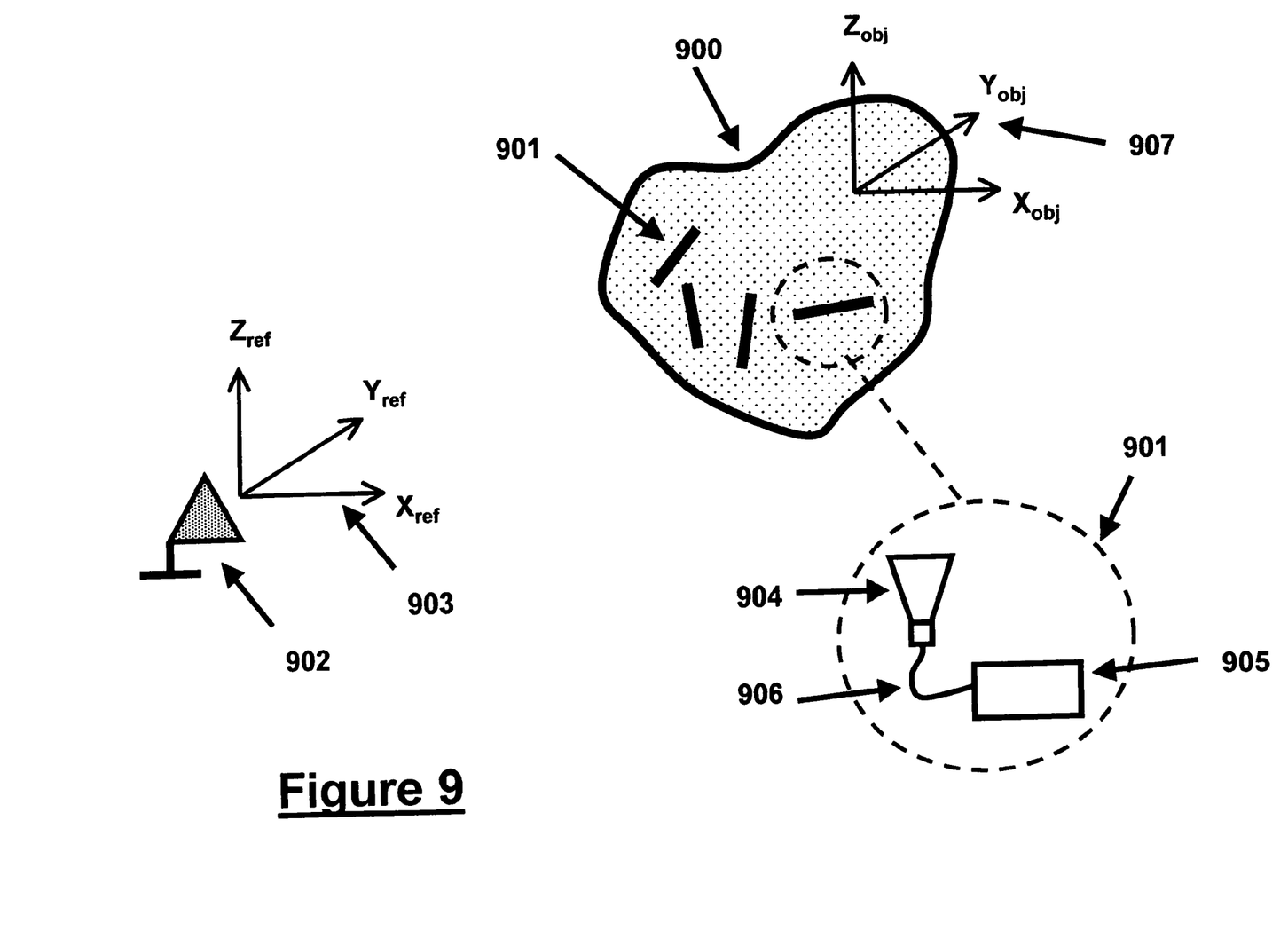
FIG. 9 shows the main components of the preferred embodiment of the present embedded position and orientation measuring system.

FIG. 9 shows the main components of an embodiment of the present embedded position and orientation measuring system. The schematic shows the object 900 with the embedded (attached) waveguide sensor units 901. The coordinated system $X_{obj}Y_{obj}Z_{obj}$ (907) is considered to be fixed to the object 900. Each waveguide sensor unit 901 consists of a waveguide 904, the output of which is sent to the data collection and processor unit 905 via a connection 906. Preferably, one central data collection and processing unit 906 serves all the waveguide sensor units 901, and is used to perform the aforementioned position and orientation calculations. Three or more polarized radio frequency illuminating sources 902 are positioned at different locations (only one source is shown in FIG. 9 for clarity). The illuminating sources 902 may be fixed or moving. A reference coordinate system $X_{ref}Y_{ref}Z_{ref}$ (903) is considered to be fixed to the illuminating source. The three or more reference coordinate systems 903 define a referencing system relative to which the position and orientation of the object 900 is to be measured.

In another embodiment, the autonomous absolute position and orientation sensors disclosed above and in U.S. Pat. No. 6,724,341, are utilized for validation of the performance of onboard guidance and control hardware and software and algorithms in general and the onboard position and orientation sensors in particular. Thus, the above described waveguide sensors 100 are embedded in the moving object 20 to measure its full position and orientation relative to a ground station 400. One or more of the waveguides 100 onboard the moving object 20 are then used as transmitters to transmit the position and orientation information along with other data related to the operation of the guidance and control systems, other sensory information, the operation of the individual components, etc., back to the ground station 400. The transmitted data can be processed onboard the object in processor 21, or preferably at the ground station 400 at processor 401 to minimize the computational and power requirement onboard the moving object 20. The transmitted signal is preferably digitized onboard the moving object 20 by processor 401 or A/D converter connected thereto) and then transmitted to the ground station 400. Although described with regard to FIGS. 1-4, the systems shown in FIGS. 5-9 may also be used.

It is appreciated by those skilled in the art that the ground station 400 may itself be moving. The illuminating source(s) at the ground station 400 can and are preferably used to receive the transmitted signal from the moving object 20.

In another embodiment, the aforementioned waveguide sensors disclosed above are included in the moving objects and used as one or more of: 1) auxiliary sensors, or 2) as redundant sensors to increase the accuracy of the main system sensors, or 3) as the means to set and/or reset inertia based sensors following settling time(s) and at certain intervals to compensate for drifting, etc., and/or 4) for the moving object to receive commands for certain actions or for changing or modifying its trajectory, orientation, spin, etc.

While a guided object is traveling along a prescribed trajectory, it is often desirable to change or modify the prescribed trajectory. This is also the case when the object is directed to move to or towards a target position without specifying a desired path towards the indicated target position. The decision to vary the trajectory and/or the target position is considered to be made at a planning station and not onboard the moving object itself. For example, when a robot is being guided remotely to a desired object, if the target object is moved, the specified path can be corrected at a planning station and transmitted to the mobile robot. This also obviously applies to situations in which the target object or position or the desired trajectory is changed for some other reasons.

Alternatively, the robot may have been equipped with sensory systems to recognize or follow the movement of the target object, and internally adjust its path of motion to accommodate variations in the target object position. Such sensors are generally classified as homing sensors and also include the class of homing sensors that are based on following a provided signal, for example, riding a laser beam or following the reflection of such a beam off the target object provided by, for example, a forward observer. For purposes of the methods and systems disclosed herein, such trajectory and/or target position correction is not to be based on such homing sensory devices, even though the moving object could be equipped with such homing sensory devices, which are customarily used once the moving object is relatively close to its target object or position.

In another embodiment a system is provided where, once the decision is made to modify the trajectory of the moving object or the target position, appropriate information is transmitted to the moving object from the planning station, which is then used by its onboard guidance and control system to take the appropriate corrective action. The transmitted information may, for example be a new trajectory from the current position of the moving object or may simply be the new target position.

The moving object is considered to be equipped with the waveguide sensors as disclosed above and in the U.S. Pat. No. 6,724,341. While the moving object is traveling along its specified trajectory or towards its designated target position, by properly moving (rotating and/or displacing) the illuminating source(s), the moving target is forced to change its course along or towards a new target position. The illuminating source(s) an be moved by any means known in the art, such as by being on a mobile platform, or by being on a stationary platform having actuators, motors and the like for moving the illuminating source(s).

For example, consider the waveguide sensor 100 shown embedded in the moving object 20 (in this case a guided munition in flight) and the illuminating source 400 (in this case positioned on the ground) illustrated in FIGS. 1-4. Assume that the trajectory of the moving object consists of a linear motion away from the illuminating source 400 with zero rotation relative to the illuminating source. As a result, if the moving object is disturbed from its intended trajectory, e.g., is rotated slightly about the reference axis $Y_{ref}$, then a guidance and control system 22 onboard the moving object senses such a change from feedback from the on board waveguide sensors 100 and activates appropriate actuation devices to cause the axis $\theta_x$ ($\theta_z$) to align with the reference axis $X_{ref}$ ($Z_{ref}$). The guidance and control system 22 can be any mechanical, electrical, and chemical devices known in the art for guiding and controlling the flight of a projectile and is assumed to be operatively connected to both the waveguide sensors 100 (through processor 21) and the control devices.

Now consider the situation in which the ground station located at the illuminator 400 decides that for some reasons the moving object 20 has to be rotated a certain amount about the $Y_{ref}$ axis. To achieve this goal, the ground station 400 need only to rotate the illuminating source 400 the same amount about its $Y_{ref}$ axis, thereby producing an error (about the $\theta_y$ axis) onboard the moving object, which its guidance and control system 22 would tend to correct as described above, thereby causing the moving object to be rotated the desired amount about the $Y_{ref}$ axis. In a similar manner, by displacing and/or rotating the illuminating sources 400 properly, the trajectory and/or the target position of the moving object can be readily modified.

In another embodiment, the moving object 20 can be commanded to move while pointed in a specified direction that is, for example, described by the relative orientation of the coordinate system $\theta_x, \theta_y, \theta_z$ that is fixed to the moving object 20 relative to the reference coordinate system $X_{ref} Y_{ref} Z_{ref}$. Then the moving object 20 is guided along a desired path or to a desired target position by properly rotating the illuminating source(s) 400, i.e., the reference coordinate system, thereby forcing the direction of motion to be modified through rotation of the moving object 20. The illuminating source 400 may obviously be fixed (relative to the ground) or be moving.

In another embodiment, the illuminating source 400 can be mounted on a body of a weapon platform 730, for example a tank, and is fixed (or is made to move together with) the sighting system 731 of the tank 730. Then as the tank personnel manning the sighting system points the sighting system to a desired target, which in turn points the tank gun to the selected target, then the illuminating source 400 indicates the direction that a projectile that is fired from the gun has to travel to hit the designated target. During its flight, the guidance and control system 22 onboard the projectile 20 will then compensate for all disturbances and errors to keep the projectile lined up with the illuminating source 400, i.e., the sighting system. In addition, in case that the target is moved or for certain reasons the projectile trajectory has to be changed or modified, then by just turning the sighting system, i.e., the illuminating source 400, in the desired direction, the projectile course is modified by its guidance and control system 22, which would tend to keep the aforementioned moving object 20 fixed and the reference coordinate systems lined up as initially designated.

With the above illuminating source(s) 400 that are integrated into the target sighting systems, the moving object 20 (in this case a gun-fired projectile) can be guided to the target by the sighting system located at the illuminating source 400 (in this case on the body of the tank).

Although described with regard to FIGS. 1-4, the embodiments discussed above can also use the systems shown in FIGS. 5-9.

Consider the situation in which one or more waveguide sensors similar to 100 shown in FIG. 1 (marked 501 in FIG. 11) are embedded at the lower end of a sub-munition 502 that has been dropped in the vicinity of a target 504 with a parachute 503. The waveguide sensor(s) 501 may also be used to transmit an RF signal, i.e., act as the illuminator 400 shown in FIG. 1. The parachute 503 may also be biased aerodynamically to rotate about the vertical axis as it descends.

Figure 11:
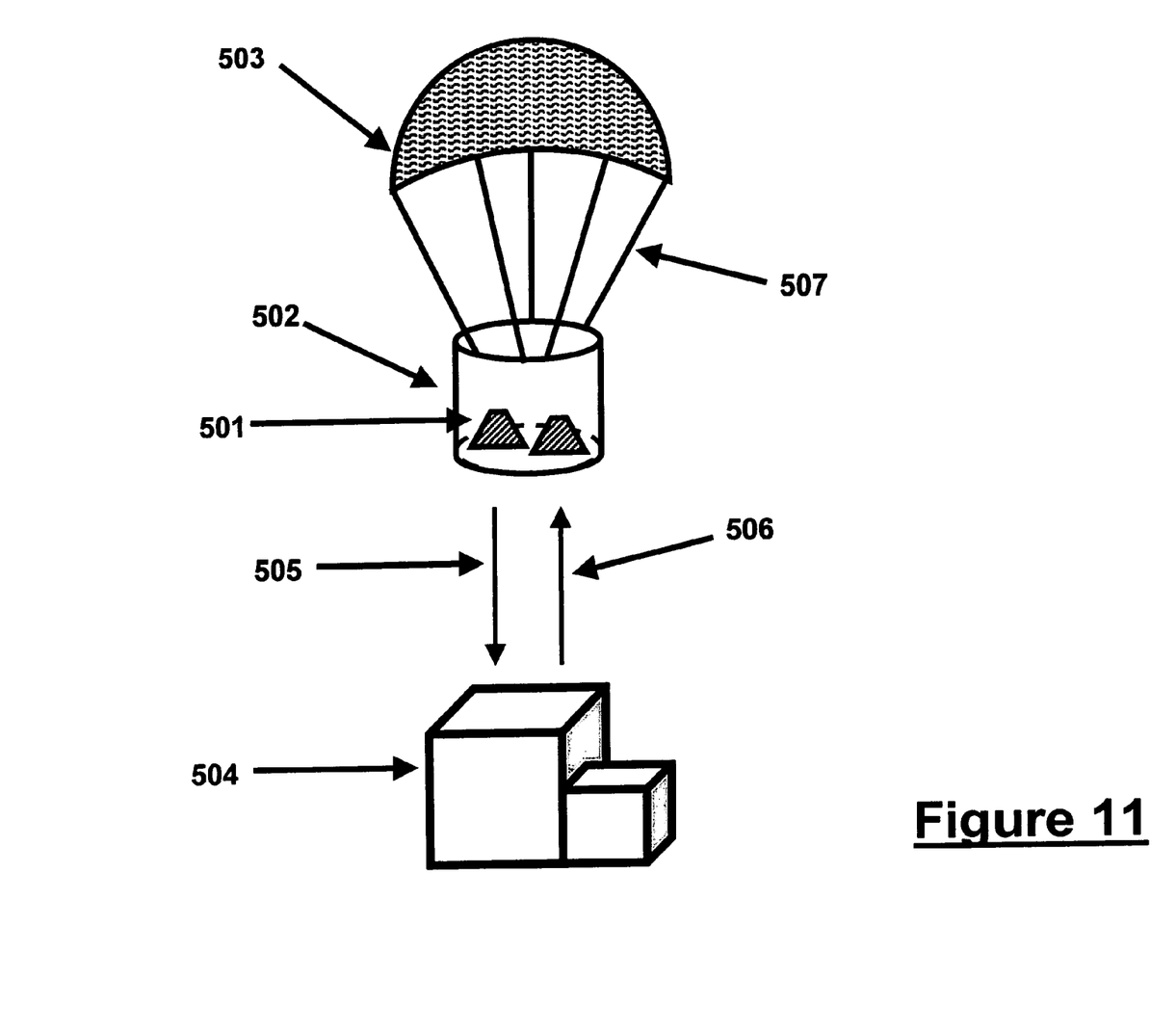
FIG. 11 illustrates another embodiment in which the waveguide sensor system is used to guide an object to a target location as the object descends towards the target location.

In one embodiment of the present invention, the descending parachute 503 is rotating about its vertical axis. At least one of the waveguide sensors 501 transmit an RF signal 505 and at least one waveguide sensor 501 receives the signal 506 that is reflected off the target. In general, targets are metallic or otherwise have different characteristics than its surroundings and provide a stronger reflected signal than the surrounding environment. The frequency of the RF signal is preferably selected such that it is more prone to be absorbed by the surrounding ground. Since the sub-munition is rotating as it descends, therefore it provides a scanning signal that can cover a relatively large area under the descending sub-munition.

As the area under the sub-munition is scanned, the receiving sensor 501 determines the direction of maximum returned signal, thereby the direction that the sub-munition has to be guided to bring it closer to being positioned on the top of the target. In general, an actuation device is used to guide the sub-munition laterally. For the sub-munitions using parachutes, this can, for example, be readily done by tightening or loosening one or more of the parachute strings 507.

It many situations, for example when signal interference is of concern or in the case of a weapon platform where being detected by the enemy is of great concern, the illuminating sources are desired to reach the waveguide sensors on the object but not travel significantly further. As an example, the illuminator of a waveguide angular orientation sensor may be positioned on the body of a tank and the waveguide sensor may be positioned on the gun barrel, preferably near the barrel exit. Such a sensory system is very useful since it can accurately and continuously provide information on the actual orientation of the barrel relative to the tank (or if the illuminator is positioned on the ground, relative to the ground and preferably relative to the target sighting system). In such a situation, the illuminator signal is desired to be strong enough to provide an accurate orientation reading. However, the signal is desired not to reach significantly past the barrel sensor(s). Similar situations arise when the illuminating signal is used to provide a reference signal for moving platforms or other weapon systems in the field. In these situations, the frequency of the illuminating signal is selected to fall within well-known ranges that result in a rapid rate of absorption by the surrounding medium, in this case the air and the moisture in the air. As a result, by the time the illuminating signal reaches the enemy, it is well below the detection threshold.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for transmitting data from a moving object to a receiver at a remote location, the method comprising:
    transmitting a signal from an illuminating source;
    receiving the signal at three or more cavity waveguides disposed on the object;
    determining at least one of a position and orientation of the object relative to the illuminating source based on a strength of the signal received in the three or more cavity waveguides;
    transmitting data representing at least one of the determined position and orientation to the receiver; and
    testing the accuracy of at least one of the three or more cavity waveguides based on the transmitted data.

2. A method for generating data representing at least one of a determined position and orientation of a moving object, the method comprising:
    transmitting a signal from an illuminating source;
    receiving the signal at three or more cavity waveguides disposed on the object;
    determining at least one of a position and orientation of the object relative to the illuminating source based on a strength of the signal received in the three or more cavity waveguides;
    generating data representing at least one of the determined position and orientation for use in the object;
    transmitting data representing at least one of the determined position and orientation to a receiver; and
    testing the accuracy of at least one of the three or more cavity waveguides based on the transmitted data.

* * * * *